Figure 1:
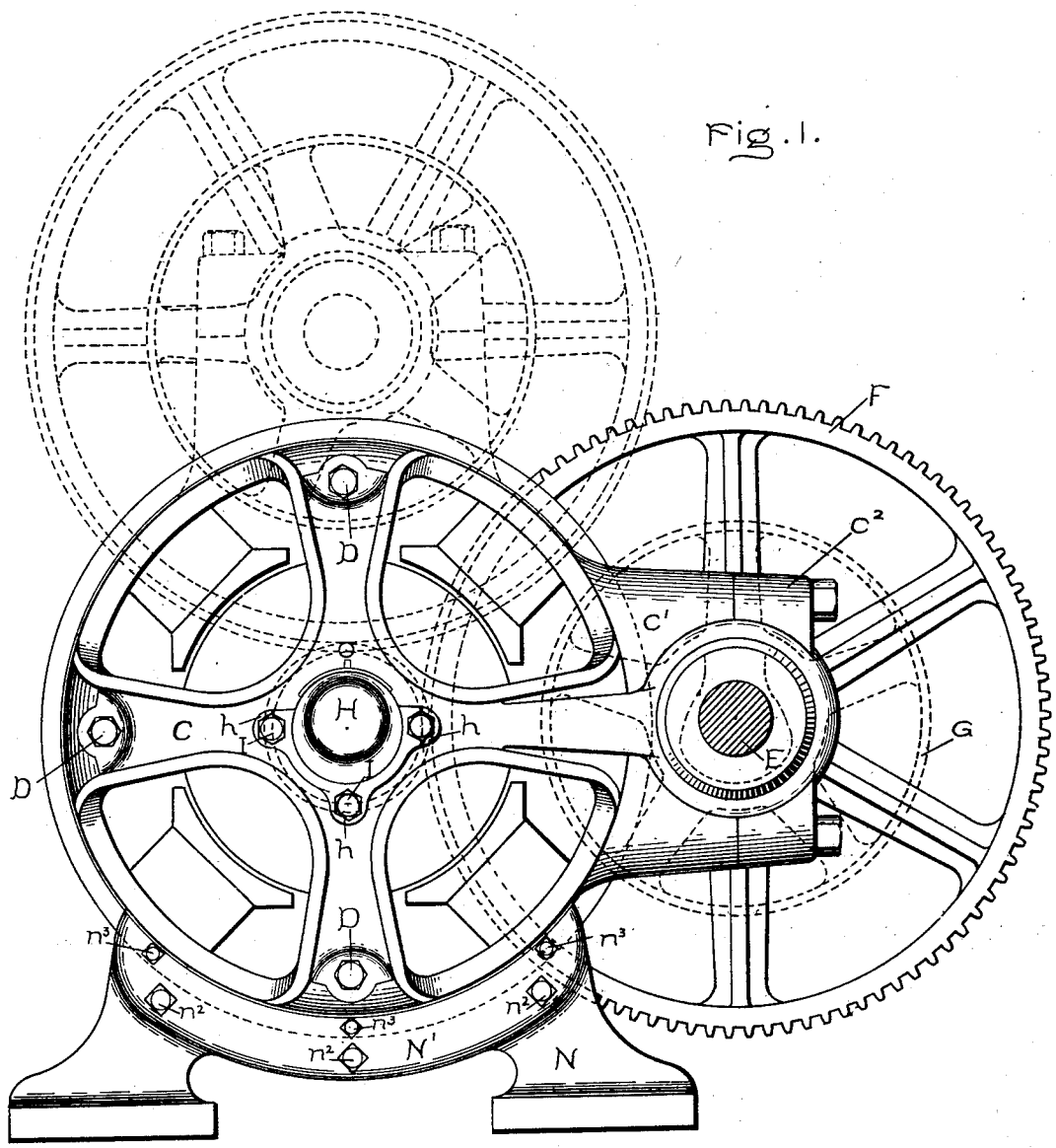

No. 735,052. PATENTED AUG. 4, 1903.
N. C. BASSETT.
ELECTRIC MOTOR.
APPLICATION FILED DEC. 5, 1900.
NO MODEL. 2 SHEETS—SHEET 1.

Witnesses:
Frank G. Hattie
Alex F. Macdonald

Inventor:
Norman C. Bassett,
By Albert G. Davis
Atty.

No. 735,052. PATENTED AUG. 4, 1903.
N. C. BASSETT.
ELECTRIC MOTOR.
APPLICATION FILED DEC. 5, 1900.
NO MODEL. 2 SHEETS—SHEET 2.
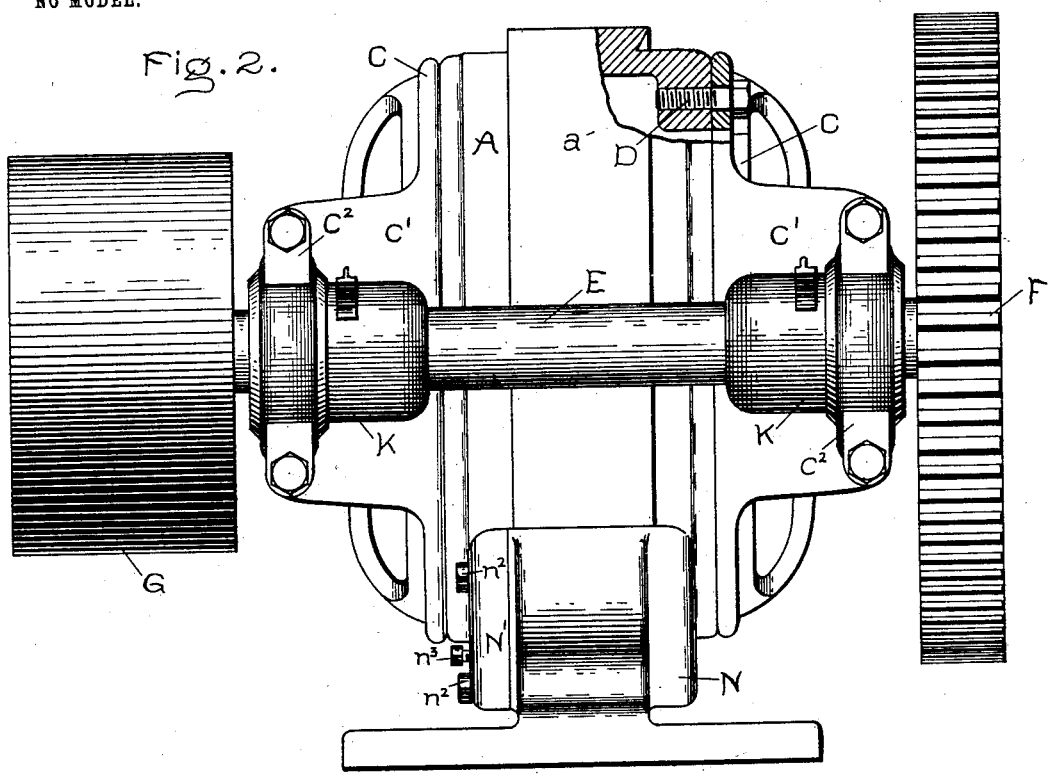
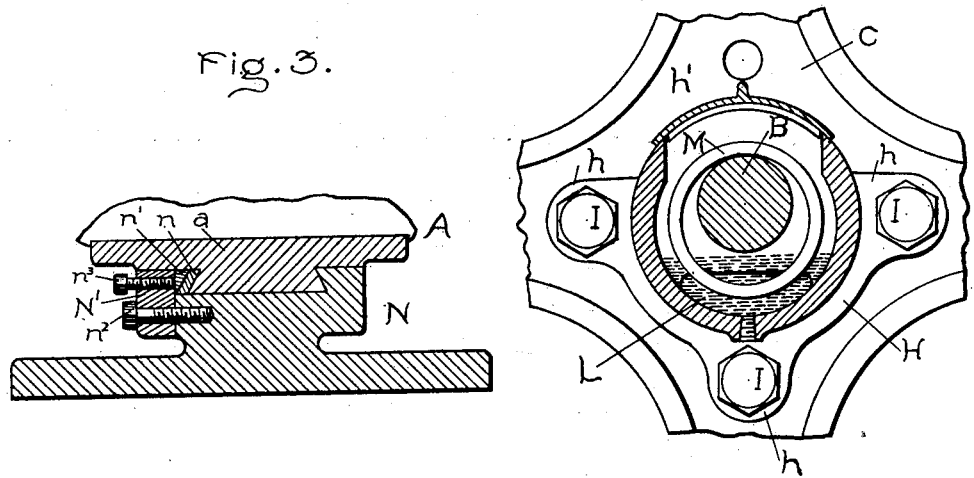
Witnesses:
Frank G. Cottie
Alex F. Macdonald
Inventor:
Norman C. Bassett,
By Albert G. Davis.
Atty.
THE NORRIS PETERS CO., PHOTO-LITHO., WASHINGTON, D. C.

No. 735,052. Patented August 4, 1903.

UNITED STATES PATENT OFFICE.

NORMAN C. BASSETT, OF BOSTON, MASSACHUSETTS, ASSIGNOR TO GENERAL ELECTRIC COMPANY, A CORPORATION OF NEW YORK.

ELECTRIC MOTOR.

SPECIFICATION forming part of Letters Patent No. 735,052, dated August 4, 1903.

Application filed December 5, 1900. Serial No. 38,760. (No model.)

*To all whom it may concern:*

Be it known that I, NORMAN C. BASSETT, a citizen of the United States, residing at Boston, county of Suffolk, State of Massachusetts, have invented certain new and useful Improvements in Electric Motors, of which the following is a specification.

This invention relates to what are known as "back-geared" electric motors, in which the armature-shaft carries a pinion meshing with a spur-gear on one end of the counter-shaft, which carries at its other end a belt-pulley, the object being to reduce the speed of the belt-pulley, so that the motor can be used for driving slow-running machinery. The counter-shaft is parallel with the armature-shaft and is journaled in bearings on the frame of the motor.

The object of my invention is to provide a construction by means of which the counter-shaft with its spur-gear and belt-pulley can be angularly shifted to any one of several positions around the periphery of the motor-frame in order to adapt the motor for use in various situations.

In the accompanying drawings, Figure 1 is an end elevation of a motor embodying my invention. Fig. 2 is a side elevation of the same. Fig. 3 is a detail cross-section on a vertical axial plane of Fig. 1. Fig. 4 is a sectional elevation, on an enlarged scale, of the self-oiling bearing for the armature-shaft.

The field-magnet frame A of the motor has a cylindrical periphery concentric with the armature-shaft B, which is journaled in bearings in the two circular heads C, which are fitted to rotate on the ends of the magnet-frame and are securely clamped against said ends by screw-bolts D, spaced at equal distances apart on a circle concentric with the shaft B. The edges of the heads are faced off to fit flat against the ends of the frame, as shown in the broken-away portion of Fig. 2. On one side of each head there is a bracket or projection C', forming a journal-bearing for the counter-shaft E. Caps $C^2$ retain the shaft in place. A spur-gear F is secured on one end of the counter-shaft, meshing with a pinion on the armature-shaft. The other end of the counter-shaft carries a belt-pulley G. Each head C carries bearings H for the armature-shaft, which are provided with oil-wells, as shown in Fig. 4. Each bearing has one or more arms $h$, by means of which it can be fastened to the head C by a bolt I. The bearings K of the counter-shaft have similar oil-wells in them. The wells extend below their shafts, so as to give room for a body of oil L, which can be carried up to the journal by any suitable device, such as a ring M, hung on the journal and dipping in the oil. A cap $h'$ covers the top of the well. When it is desired to change the counter-shaft from one side of the motor, as shown in full lines in Fig. 1, to a position above the motor, as indicated by the dotted lines in said figure, the bolts D are removed and the heads C are rotated a quarter-turn. The bolt-holes in the heads and magnet-frame now coincide again, so that the bolts can be replaced. In the same way the heads can be given another quarter-turn to bring the counter-shaft to a position diametrically opposite that in which it is shown in Fig. 1. By increasing the number of bolts and spacing them at equal distances apart the counter-shaft can be shifted to a corresponding number of positions. Every time the heads are rotated to shift the counter-shaft the bearings of the armature-shaft and counter-shaft must be changed to keep the oil-wells below the journals. The heads are provided with extra bolt-holes spaced equidistant at the same angular distances as the bolts for fastening the heads C and symmetrically arranged around the shaft, so that after removing the fastening-bolts the bearings can be given a partial backward rotation to compensate for the forward rotation of the heads and then be bolted in place again. The bearings for the counter-shaft also can be backwardly rotated by loosening the bolts which hold the caps $C^2$.

The magnet-frame is provided with legs which may be integral, but are preferably formed on a saddle N, in which the magnet-frame rests. The frame has a circumferential cylindrical rib $a$ with dovetail edges engaging with a dovetail groove in the saddle, which is curved to fit the rib. One side of the groove is preferably formed by a wearing-strip $n$, backed by an angular filling-piece $n'$, both of which are clamped against the rib by a segment N' and fastening-screws $n^2$. The strip and filling-piece can be adjusted for wear by set-screws $n^3$.

This construction permits the whole motor to be angularly adjusted around the axis of the armature-shaft to occupy positions intermediate to those provided for by shifting the counter-shaft or to take up slack in the belt driven by the pulley G.

What I claim as new, and desire to secure by Letters Patent of the United States, is—

1. The combination with an electric-motor frame, of rotatably-adjustable heads having lateral projections, armature-shaft bearings concentric with said heads, and counter-shaft bearings in said projections, said bearings having oil-wells in their lower sides and being rotatably adjustable to compensate for the rotation of the heads.

2. An electric motor having its frame provided with a circumferential cylindrical rib, of a saddle fitting said rib, and means for clamping the rib in the saddle.

3. The combination in a back-geared electric motor, of a saddle for supporting the motor-frame, revolving shafts mechanically united and means for angularly adjusting the frame in the saddle.

4. In a back-gear device for electric machines, the combination of a back-gear axle, brackets between the machine and said axle, bearings arranged in the brackets for the axles, and provided with oiling mechanism, and means for adjusting the position of the bearings with respect to the brackets and keeping the oiling mechanism horizontal.

In witness whereof I have hereunto set my hand this 3d day of December, 1900.

NORMAN C. BASSETT.

Witnesses:
DUGALD McKILLOP,
JOHN J. WALKER.